United States Patent

Kirk

[15] 3,661,210

[45] May 9, 1972

[54] INCREASING INJECTIVITY AND PRODUCTIVITY INDEXES OF A GAS WELL

[72] Inventor: Walter B. Kirk, Robinson, Ill.

[73] Assignee: Marathon Oil Company, Findlay, Ohio

[22] Filed: Mar. 19, 1970

[21] Appl. No.: 21,203

[52] U.S. Cl. .....................................................166/305 D
[51] Int. Cl. ..........................................................E21b 43/25
[58] Field of Search............166/305 R, 273, 274, 275, 305 D

[56] References Cited

UNITED STATES PATENTS

| | | | |
|---|---|---|---|
| 3,537,523 | 11/1970 | Gogarty et al | 166/305 R |
| 3,406,754 | 10/1968 | Gogarty | 166/273 |
| 3,467,188 | 9/1969 | Gogarty | 166/274 |
| 3,474,865 | 10/1969 | Gogarty et al. | 166/274 |
| 3,545,546 | 12/1970 | Surkalo | 166/305 R |

*Primary Examiner*—Stephen J. Novosad
*Attorney*—Joseph C. Herring, Richard C. Willson, Jr. and Jack L. Hummel

[57] ABSTRACT

The injectivity and productivity indexes of a well in fluid communication with a subterranean hydrocarbon reservoir used for the storage of hydrocarbon is enhanced by injecting 1–500 gallons of a micellar dispersion per vertical foot of reservoir and then displacing the micellar dispersion out into the reservoir. Preferably 0.1–50 volumes of water per volume of micellar dispersion is injected after the micellar dispersion and preferably gas is injected behind the water to displace substantially all of the water out into the reservoir and to re-establish a gas phase in the immediate vicinity of the well bore.

16 Claims, No Drawings

INCREASING INJECTIVITY AND PRODUCTIVITY INDEXES OF A GAS WELL

BACKGROUND OF THE INVENTION

1. Field of the Invention

This invention relates to improving the injectivity and productivity indexes of a well in fluid communication with a subterranean, hydrocarbon storage reservoir. This is effected with a miscible-type agent, i.e. a micellar dispersion comprised of hydrocarbon, surfactant, and aqueous medium.

2. Description of the Prior Art

U. S. Pat. No. 2,369,831 to Jones teaches increasing the effective permeability of an oil or gas well by introducing a soluble oil into the well, forcing the soluble oil approximately 4–5 feet into the surrounding formation, then withdrawing the soluble oil containing any material solubilized by the soluble oil. Particular soluble oils mentioned are "anhydrous" soluble oils.

U. S. Pat. No. 2,356,205 to Blair, Jr. et al. teaches the use of micellar solutions to remove wax, associated occlusions, and brine from the immediate well bore vicinity of a producing well. This is done by injecting a micellar solution into the well bore, permitting the micellar solution to solubilize, disperse or disrupt the waxy or allied occlusions, and then permitting the production well to produce to remove the solubilized matter uphole.

Subterranean reservoirs are used to store hydrocarbon. There is an increase in use of depleted reservoirs as storage places for the gas. Such is useful to take care of seasonal changes in market demands for gas. It is important that the reservoir be kept in good condition since the peak-load demands during winter depend upon the reservoir operating efficiently, e.g. the productivity index is desirably high.

SUMMARY OF THE INVENTION

The injectivity and productivity indexes of subterranean reservoirs used to store hydrocarbon are improved by injecting a micellar dispersion and then injecting a gas to re-establish the gas phase within the reservoir. Optionally, water can be injected behind the micellar dispersion and previous to the injection of the gas.

DESCRIPTION OF THE PREFERRED EMBODIMENTS OF INVENTION

The micellar dispersion is also known as a micellar solution, microemulsion, soluble oil, "transparent" emulsion, etc. Examples of useful micellar solutions include those defined in U. S. Pat. Nos. 3,254,714; 3,275,075; 3,307,628; 3,476,184; and 3,497,006 and U. S. Ser. Nos. 693,099 and 693,125 by Jones, both filed Dec. 26, 1967. The micellar dispersion is comprised of hydrocarbon, aqueous medium, and surfactant, and optionally cosurfactant and/or electrolyte. Examples of volume amounts include about 1 to about 80 percent hydrocarbon, about 10 to about 95 percent water, at least about 4 percent surfactant, about 0.01 to about 20 percent or more cosurfactant, and 0.001 to about 5 percent or more by weight of electrolyte.

The hydrocarbon can be crude oil, partially refined fractions of crude oil, or refined fractions of crude oil. Also, synthesized hydrocarbons are useful. In addition, the unreacted hydrocarbon within petroleum sulfonate is useful.

The water can be soft, brine or brackish water. Where the water does contain ions, it is preferred that the ions are compatible with those ions within the subterranean formation.

Examples include those surfactants defined in U. S. Pat. No. 3,497,006 to Jones et al. The surfactant can be cationic, anionic, or nonionic surface-active agent. Preferred examples include petroleum sulfonates having an average equivalent weight within the range of about 350 to about 525 and more preferably about 390 to about 460. The sodium and ammonium petroleum sulfonates are especially useful with this invention.

The cosurfactant (also identified as a semi-polar organic compound or cosolubilizer) can be a ketone, ester, amine, amino compound, alcohol, ether, aldehyde or like material containing about one to about 20 or more carbon atoms. Preferably, the cosurfactant is an alcohol, such as normal, secondary or tertiary alcohol, it can contain ether or like grouping within the molecule, such as 2-butoxyethanol.

The electrolyte can be an inorganic acid, inorganic base, inorganic salt, or organic acid, organic base, or organic salt. Examples include those defined in U. S. Pat. No. 3,297,084 to Gogarty et al. and U. S. Pat. No. 3,330,343 to Tosch et al. Preferably the electrolyte is present at concentrations of about 0.01 to about 4 percent by weight in the aqueous medium.

The micellar dispersion can contain other additives such as oxygen scavengers, bactericides, corrosion inhibitors, etc.

It is important that the injectivity index and the productivity index of wells in fluid communication with the subterranean reservoir used for the storage of hydrocarbon be maintained at a high level. That is, during the storage of natural gas, it is important that injectivity index be such that hydrocarbons, e.g. natural gas, can be readily pumped into the reservoir. Also, during peak-loads, it is important that the natural gas be withdrawn at a rapid rate to satisfy the demand, thus the productivity index is desirably high.

During the pumping of natural gas into the reservoir, the reservoir can become contaminated with foreign material, e.g. waxy material, high molecular weight hydrocarbons, lubricants from compressors, valves, and equipment associated with the collection and transfer of natural gas into the reservoir, etc. The lubricants can contaminate the rock so that the injectivity index is adversely affected. Also, during the withdrawal of the gas, the productivity index of the rock will be adversely affected due to the contamination. The micellar dispersion is useful to solubilize these contaminants so that the injectivity index and the productivity index of the reservoir rock will be improved.

Injecting about 1 to about 500 gallons of a micellar dispersion per vertical foot of the reservoir is useful to solubilize contaminants and in general improve the injectivity index and the productivity index of the reservoir. More preferably from about 5 to about 250 gallons of the micellar dispersion per vertical foot of the reservoir are useful. The micellar dispersion can be an oil-external or a water-external micellar dispersion. Preferably it is oil-external.

After the micellar dispersion is injected into the reservoir, it is followed with sufficient gas to substantially displace the micellar dispersion out into the reservoir, e.g. at least about 7.5 and preferably 15 feet in radius from the well bore. Optionally, water can be injected behind the micellar dispersion in amounts of about 0.1 to about 50 volumes per volume of micellar dispersion. The water can act as a mobility buffer so that the gas can more favorably displace the micellar dispersion out into the reservoir. It is preferred that the water be injected after the micellar dispersion.

The amount of gas useful to displace the micellar dispersion and optionally micellar dispersion and water slugs into the reservoir should be sufficient to displace substantially all of the slug that precedes it out to a radius of at least about 7.5 feet from the well bore. The gas can be inorganic or organic, examples include $N_2$, $CO_2$, oxidation products from natural gas, lower molecular weight hydrocarbons such as methane, ethane, propane, and like products.

The water slug that can optionally follow the micellar dispersion can be soft water, brine water, or brackish water. Preferably it is a water containing ions compatible with the ions within the reservoir, more preferably the ions are characteristic of those within the reservoir. Also, it is preferred that the water is compatible with the reservoir rock.

It is not intended that this invention be limited by the particulars taught herein. Rather, all equivalents obvious to those skilled in the art are intended to be incorporated within the scope of the invention as defined within the specification and appended claims.

What is claimed is:

1. A process of increasing the injectivity index and productivity index of a subterranean reservoir useful in the storage of hydrocarbon, the process comprising:
   a. injecting into the reservoir about 1 to about 500 gallons of a micellar dispersion per vertical foot of the reservoir,
   b. displacing the micellar dispersion out into the reservoir by injecting a gas into the reservoir, and
   c. thereafter utilizing the reservoir treated by steps (a) and (b) for the storage of hydrocarbon.

2. The process of claim 1 wherein the micellar dispersion is comprised of hydrocarbon, surfactant, and aqueous medium.

3. The process of claim 2 wherein the micellar dispersion contains cosurfactant and/or electrolyte.

4. The process of claim 1 wherein the micellar dispersion is oil-external.

5. The process of claim 1 wherein the micellar dispersion is water-external.

6. The process of claim 1 wherein from about 5 to about 250 gallons of the micellar dispersion per vertical foot of reservoir are injected into the reservoir.

7. The process of claim 1 wherein from about 0.1 to about 50 volumes of a water slug is injected after the micellar dispersion and previous to the injection of the gas.

8. The process of claim 1 wherein sufficient gas is injected into the reservoir to substantially displace the micellar dispersion slug to a distance of at least about 7.5 feet radius from the well bore.

9. The process of claim 1 wherein sufficient gas is injected into the reservoir to substantially displace the micellar dispersion to a distance of at least about 15 feet radius from the well bore.

10. A process of increasing the injectivity index and the productivity index of a subterranean reservoir useful for the storage of natural gas, the process comprising:
    a. injecting into the reservoir about 1 to about 500 gallons of a micellar dispersion per vertical foot of reservoir, the micellar dispersion comprised of hydrocarbon, surfactant, and aqueous medium,
    b. injecting about 0.1 to about 50 volumes of water per volume of micellar dispersion, and thereafter,
    c. injecting sufficient gas to substantially displace the water out to a distance of at least about 7.5 feet in radius from the well bore, and then
    d. utilizing the reservoir treated by steps (a), (b), and (c) for the storage of the natural gas.

11. The process of claim 10 wherein the micellar dispersion contains cosurfactant and/or electrolyte.

12. The process of claim 10 wherein the micellar dispersion contains from about 1 to 80 percent hydrocarbon, about 10 to about 95 percent aqueous medium, at least about 4 percent surfactant, from about 0.01 to about 20 percent cosurfactant, the above percents based on volume, and from about 0.001 to about 5 percent by weight of electrolyte.

13. The process of claim 10 wherein the displacing gas is natural gas.

14. The process of claim 10 wherein the water of (b) contains ions characteristic of the subterranean reservoir.

15. A process of increasing the injectivity index and productivity index of a subterranean reservoir useful in the storage of hydrocarbon, the process comprising:
    a. injecting into the reservoir about 1 to about 500 gallons of a micellar dispersion per vertical foot of the reservoir, the micellar dispersion comprised of hydrocarbon, surfactant, and aqueous medium,
    b. displacing the micellar dispersion out into the reservoir by injecting natural gas into the reservoir, and,
    c. thereafter utilizing the reservoir treated by steps (a) and (b) for the storage of gas.

16. The process of claim 15 wherein the micellar dispersion contains about 1 to about 80 percent hydrocarbon, about 10 to about 95 percent aqueous medium, at least about 4 percent surfactant, about 0.01 to about 20 percent cosurfactant, the above percents based on volume, and about 0.001 to about 5 percent by weight of electrolyte.

* * * * *